United States Patent
Singer et al.

(10) Patent No.: US 8,827,141 B2
(45) Date of Patent: Sep. 9, 2014

(54) PROCESS AND DEVICE FOR CONNECTING OXIDE-DISPERSED PRECIOUS METAL SHEET USING HAMMER WELDING

(75) Inventors: Rudolf Singer, Engelstadt (DE); Stefan Zeuner, Bad Homburg v.d.H. (DE); Bernd Weber, Rodenbach (DE); Joerg Kopatz, Linsenericht-Eidengesaess (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 84 days.

(21) Appl. No.: 13/386,943

(22) PCT Filed: Jul. 20, 2010

(86) PCT No.: PCT/EP2010/004410
§ 371 (c)(1),
(2), (4) Date: Apr. 2, 2012

(87) PCT Pub. No.: WO2011/018148
PCT Pub. Date: Feb. 17, 2011

(65) Prior Publication Data
US 2012/0181325 A1    Jul. 19, 2012

(30) Foreign Application Priority Data
Aug. 12, 2009   (DE) .......................... 10 2009 037 226

(51) Int. Cl.
| | |
|---|---|
| B23K 11/00 | (2006.01) |
| B23K 20/00 | (2006.01) |
| B23K 20/24 | (2006.01) |
| B23K 20/233 | (2006.01) |
| C22C 5/04 | (2006.01) |
| B23K 20/02 | (2006.01) |

(52) U.S. Cl.
CPC ........... *B23K 20/023* (2013.01); *B22F 2998/00* (2013.01); *B23K 20/24* (2013.01); *B23K 20/233* (2013.01); *B23K 2203/08* (2013.01); *C22C 5/04* (2013.01)
USPC ........ 228/193; 228/153; 228/194; 219/78.02; 428/615

(58) Field of Classification Search
USPC ......... 228/164, 193, 194; 219/78.02; 428/615
See application file for complete search history.

(56) References Cited

U.S. PATENT DOCUMENTS

| | | | |
|---|---|---|---|
| 3,217,404 A * | 11/1965 | Berry et al. | ................... 228/194 |
| 3,301,994 A | 1/1967 | Seeloff | |
| 3,504,427 A | 4/1970 | Seeloff | |
| 4,722,469 A * | 2/1988 | Rydstad et al. | ............... 228/193 |

(Continued)

FOREIGN PATENT DOCUMENTS

| | | |
|---|---|---|
| DE | 1527299 | 1/1970 |
| DE | 226223 | 8/1985 |

(Continued)

OTHER PUBLICATIONS

International Search Report, issued in PCT/EP2010/004410, dated Dec. 21, 2010.

(Continued)

*Primary Examiner* — Devang R Patel
(74) *Attorney, Agent, or Firm* — Brinks Gilson and Lione

(57) ABSTRACT

The present invention relates to a process and a device for joining precious metal sheets (1,4) to form structural parts, and to the products (1,4) made by the process.

20 Claims, 3 Drawing Sheets

(56) References Cited

U.S. PATENT DOCUMENTS

| | | | |
|---|---|---|---|
| 4,819,859 A * | 4/1989 | Schwenninger | 228/190 |
| 6,129,997 A * | 10/2000 | Braun et al. | 428/670 |
| 7,034,247 B2 * | 4/2006 | Wildmann et al. | 219/121.63 |
| 7,038,160 B2 * | 5/2006 | Witte et al. | 219/78.02 |
| 7,150,389 B1 * | 12/2006 | Knipstrom et al. | 228/112.1 |
| 2003/0154600 A1 | 8/2003 | Umeda et al. | |
| 2005/0236372 A1 | 10/2005 | Moe et al. | |
| 2005/0258218 A1 * | 11/2005 | Schmaranzer et al. | 228/262.5 |
| 2006/0163325 A1 | 7/2006 | Sadler | |
| 2006/0201998 A1 | 9/2006 | Witte et al. | |

FOREIGN PATENT DOCUMENTS

| | | |
|---|---|---|
| DE | 10237763 | 3/2004 |
| DE | 60107267 | 11/2005 |
| DE | 60319546 | 4/2009 |
| EP | 0320877 | 6/1989 |
| JP | 03060873 | 3/1991 |
| JP | 5212577 | 8/1993 |
| JP | 10225556 | 8/1998 |
| JP | 2000051907 | 2/2000 |
| JP | 0404198 | 1/2004 |

OTHER PUBLICATIONS

International Preliminary Report on Patentability, issued in PCT/EP2010/004410, dated Feb. 23, 2012.

* cited by examiner

PROCESS AND DEVICE FOR CONNECTING OXIDE-DISPERSED PRECIOUS METAL SHEET USING HAMMER WELDING

This application is a National Stage application of International Application No. PCT/EP2010/004410, filed Jul. 20, 2010, the entire contents of which is hereby incorporated herein by reference. This application also claims priority under 35 U.S.C. §119 to German Patent Application No. 102009037226.1, filed Aug. 12, 2009, the entire contents of which is hereby incorporated herein by reference.

Structural parts consisting of precious metal and precious metal alloys, such as preferably PGM materials, are used in the glass industry, particularly in plants for the melting and hot-forming of special glass. These plant components used in fusion technology, also called PGM (Platinum Group Metals) products, serve for melting, refining, transporting, homogenizing and apportioning the liquid glass. These precious metal alloys are mostly platinum-base alloys with alloying additions of rhodium, iridium or gold. If very high structural part strengths are required owing to mechanical and/or thermal stresses imposed by the glass melt, oxide dispersion strengthened platinum-base alloys are increasingly used, since these are characterized by a higher ability to withstand thermal, mechanical and chemical stresses than standard alloys. Oxide-dispersed alloys, also referred to as ODS alloys hereinbelow, are distinguished by a very homogeneous microstructure.

Plant parts carrying glass melt are often precious metal sheet structures which are designed as thin-walled pipe systems. The molten glass flows through these at temperatures of between 1000° C. and 1700° C.

On account of their high melting point, PGM (Platinum Group Metals) materials are distinguished by high temperature resistance and, furthermore, by high mechanical strength and resistance to abrasion, and are therefore especially suitable for the production of structural parts in plants or plant parts which come into contact with the glass melt. Suitable materials are platinum and alloys of platinum and/or other PGM metals, which may optionally also contain minor amounts of base metals as further alloying components or oxidic additives. Typical materials are refined platinum, platinum-rhodium alloys and platinum-iridium alloys, which contain a small amount of finely distributed refractory metal oxide, such as in particular zirconium dioxide or yttrium oxide, to increase the strength and high-temperature creep resistance.

In addition to the selection of the suitable material, however, the production, in particular shaping, of the precious metal components also plays a significant role in determining the strength. As a rule, these components are joined together from individual metal sheets in order to provide the required geometry, and are usually connected to one another by fusion welding. In this process, the joints between the metal sheets to be connected to one another and, if appropriate, a filler material of the same type are converted into the molten state by the supply of heat and fused together. In this case, the heat of fusion can be produced by an electric arc or an ignited gas-oxygen mixture. However, if components joined in this way are exposed to very high temperatures, for example above 1200° C., the welded seam often forms the weak point of the overall material bond. Causes that have been determined are inhomogeneities in the welded seam and changes to the microstructure in the heat-affected zone. Particularly longitudinal welded seams in cylindrical structural parts, for example pipes, are at particular risk owing to the acting stresses which are almost twice as high compared with circumferential welded seams, and therefore these longitudinal welded seams often fail and tear apart. When using known welding processes, for example tungsten inert gas (TIG) welding, plasma welding, laser or autogenous welding, the alloy is melted. Whereas only very minor losses in strength can be observed in the welded seam when melting classic substitutional solid solution alloys as a result of recrystallization during use above 1200° C., the melting when welding oxide dispersion strengthened alloys leads to the coagulation and floating of a majority of the dispersoids, typically of $ZrO_2$ and/or $Y_2O_3$, in the melt. A coarse-grained solidification microstructure is formed in the welded seam. The strengthening action of the dispersoids in the welded seam is thus nullified. The ability of a component joined together in this way to withstand stresses, and the service life thereof, are then reduced to the level of components joined from standard alloys.

Measures for preventing this disadvantage are known from JP 5212577 A and EP 0320877 B1. In the processes disclosed therein, a fusion-welded seam on ODS metal sheets is subsequently covered with a Pt-ODS foil and pressed into the seam by hammering at high temperatures. This measure increases the fineness of the grain size distribution of the welded seam through the foil and consequently reduces the probability of crack formation on the surface. In addition to further obsolete alternatives, recourse has been made to integral connections formed by means of hammer-welded seams. However, connections of this type are subjected to very great variations in quality. To eliminate these variations, an extremely great expenditure for the preparation of the welded seam and very exact control of the process parameters during the welding are required. In the case of this process, uniform heating of the two materials to be joined, in particular metal sheets, during hammering proves to be difficult. When doing so, it is often scarcely possible to heat the lower metal sheet in the welding position adequately with the torch to achieve a good adhesive effect during the hammering. The process is consequently very laborious, does not necessarily lead to an optimum result and is very expensive. Furthermore, there is a fundamental problem when fabricating hammer-welded seams, in that there is a low adhesive tendency of the material during the hammering in the case of alloys with a rhodium content >4% by weight and in general in the case of ODS alloys. The oxides already present in the ODS material and/or the oxides forming during the hammering, mainly rhodium oxide, significantly reduce the adhesive bonding of the two structural parts, in particular metal sheets. The poor adhesive bonding has the effect of increasing the production expenditure considerably, but also at the same time of increasing the risk of no adequate bond being achieved any longer in certain regions of the joining region in the seam.

In DE 10237763 B4, during the production of permanent integral connections of structural parts of oxide-dispersed (ODS) metallic materials, the welding of the individual materials is respectively performed below their melting temperature, with at least partial formation of a diffusion bond in the joining region. In a second process step, the diffusion bond, preferably the entire joining region, is heated to a temperature which is likewise below the melting temperature of the materials and/or structural parts to be connected to one another and, at this temperature, is mechanically recompacted, preferably hammered. Depending on the arrangement in relation to one another before the welding operation, the two materials to be connected to one another in this case define the joins, the latter generally also forming the joining region, i.e. the region in which the desired connection between the two is to be produced. In this process, a permanent integral connection of structural parts of oxide-dispersed (ODS) metallic materials is consequently provided by arranging for the production of a diffusion-welded bond to be performed before the mechanical recompaction under heat. A preferred embodiment provides for the use of a weld filler. This is arranged in the joining region between the two materials and/or structural parts of oxide-dispersed metallic materials to be connected to one another. Here, the weld filler can be in the form of a separate element or else in the form of a coating on at least one of the joining faces which face one another in the joining region. Suitable weld fillers in this case are, in particular, ductile fused alloys, for example PtAu5, PtIr1, pure Pt, but also more solid alloys, for example PtRh5, PtRh10, PtIr3. Said document emphasizes that the weld filler makes it possible to achieve a significantly improved bond between the two materials to be connected to one another, since the adhesive tendency between the two materials is increased considerably, and this in turn reduces the production expenditure considerably. In addition, the ability of the joining zones to withstand thermal and mechanical stresses should be increased considerably. Furthermore, said document emphasizes that the insertion of a precious metal foil is preferred above all. In a preferred embodiment this document teaches that the edges of the metal sheets to be connected are chamfered, placed above each other with the chamfered edges exactly on each other and, in a frost step, are first connected provisionally with a diffusion bond that is recompacted mechanically to effect the final dissuion bond in a subsequent step.

It is a disadvantage that the chamfered portions of the edges are faced toward each other and overlapped exactly, which will either result in a diffusion bond being thinner than the other metal sheet, or a less intense diffusion bond, which both results in a lower strength of the bond, in particular when mechanical load is applied. In addition, the use of weld fillers or foils of a different composition than the metal sheets to be connected is disadvantageous because the resulting Kirkendall-Effect will cause pore formation.

The invention is based on the object of providing an improved and/or alternative process for connecting oxide-dispersed precious metal sheets and a device for carrying out this process.

Suitable precious metal sheets are metal sheets consisting of a precious metal selected from the group consisting of ruthenium, rhodium, palladium, silver, osmium, iridium, platinum, gold and the alloys thereof with one another and other metals, preferably selected from the group consisting of gold, platinum, rhodium, iridium and the alloys thereof with one another and other metals, in particular pure platinum, alloys of platinum with gold, iridium or rhodium, in particular alloys selected from the group consisting of PtAu5, PtIr1, PtRh5, PtRh10, PtIr3. According to the invention, the precious metal sheets are oxide-dispersed, i.e. fine-grain stabilized by dispersion of suitable oxides. These oxides are generally rare earth oxides, for example yttrium oxide, zirconium dioxide. Particular preference is given to metal sheets consisting of platinum, PtAu5, PtIr1, PtRh5, PtRh10 or PtIr3, which are oxide-dispersed either with yttrium oxide or zirconium dioxide.

This object is achieved by the subject matter of the claims, and as disclosed in the present description.

According to a first aspect, the invention relates, in particular, to a process mentioned above, comprising the following steps: a base is preheated, at least two metal sheet portions to be connected are arranged so as to overlap, at least one metal sheet portion resting on the base, and the metal sheet portions are subjected to diffusion hammer welding. In this case, a base can have a straight or bent form or any other unitary or combined forms, and may be an anvil. The base preferably has a form which corresponds, in particular, to the form subsequently desired in the region of the diffusion welding. Therefore, if a tubular article is to be formed, the base is preferably formed with a radius of curvature which is the same as or similar to the tubular article. The overlapping arrangement can be provided manually or with the aid of a machine. Metal sheet regions adjacent to the metal sheet portions to be overlapped are preferably clamped, so as to prevent them from slipping out of place during the preparation and the diffusion hammer welding.

Furthermore, according to a further aspect, edges are preferably chamfered, further preferably chamfered in a straight manner. Here, the metal sheet portions to be connected are chamfered in such a manner that the chamfered edges subsequently extend outwards, i.e. away from the adjacent metal sheet portion, when the metal sheet portions are arranged so as to overlap. It has been found that chamfering and aligning of the metal sheet portions in this way increases the creep rupture strength of the finished, joined product. This is shown below in even more detail. In this case too, the metal sheet portions are subjected to diffusion hammer welding. A preferred process according to the invention also comprises the two aspects discussed above, i.e. the provision and preheating of a base as well as the formation of the chamfers in the manner presented.

A chamfer width (F) of the chamfered edges is preferably 1 to 3 times, preferably twice, the original metal sheet thickness ($t_0$). Further preferably, the chamfer angle $\alpha$ is about 15 to about 27°, preferably about 17.6 to about 25.6°, further preferably about 19.6 to about 23.6° and most preferably about 21.6°. The chamfered edges are preferably shaped in such a way that the chamfered portions of the edges are parallel or at least substantially parallel to each other, that means both edges would supplement each other when the chamfered portions are arranged facing towards each other. This is always the case when the chamfer angle $\alpha$ is identical for both edges.

According to the invention, the base is preheated to about 300 to about 600° C., preferably about 350 to about 550° C., further preferably to about 400 to about 500° C. This can be done in any desired way, for example by heating the base using a flame, in a suitable furnace or preferably by induction or resistance heaters provided in and/or on the base.

Furthermore, according to the invention, the overlapping arrangement involves arranging the metal sheet portions preferably directly one above/below another. Therefore, no weld fillers and/or foils are provided between the metal sheet portions. According to the invention, also no bandage is used, that means no additional tube section or metal sheet will be placed above or below the overlapping portions of the metal sheets are placed that will be introduced into the diffusion bond between the edges to be connected, as is e.g. shown in FIG. 1 of DE 1527299. It has been found that the present invention nevertheless yields better creep rupture strengths than the prior art.

The metal sheet portions are preferably arranged so as to overlap with an overlap length which is 2.5 to 7.5 times an original metal sheet thickness ($t_0$), preferably 4 to 7 times the original metal sheet thickness ($t_0$). After the diffusion welding, the overlap of the metal sheet portions is 3 to 8 times an original metal sheet thickness ($t_0$), preferably 5 to 7 times the original metal sheet thickness ($t_0$).

The diffusion hammer welding is preferably carried out using a gas-oxygen torch. Therefore, the metal sheet portions are heated locally, preferably to a temperature of about 1000° C. to about 1700° C., further preferably to a temperature of about 1200° C. to about 1300° C. or of about 1400° C. to about 1600° C. Further preferably, the metal sheet portions are roughened on the mutually facing sides before they are arranged so as to overlap, preferably with a surface roughness $R_a$ of about 0.05 to about 25 μm, and further preferably of about 0.5 to about 10 μm. This roughness may already be provided during chamfering by severing with defined cutting edges, or else by subsequent surface machining by severing with undefined cutting edges, for example grinding. Roughening makes it possible to provide an enlarged surface area in the region of the diffusion welding, and/or makes improved controllability of the welding parameters possible.

The invention also provides that, after the diffusion hammer welding, the seam produced by the diffusion hammer welding is subjected to cold- or hot-forming, in order to smooth the seam and/or reduce its thickness. In this process, the thickness is preferably reduced to 0.9 to 1.2 times the original metal sheet thickness ($t_0$), and further preferably to about the original metal sheet thickness ($t_0$). The seam can then also be provided with a surface finish by grinding down and polishing the seam—if appropriate together with the entire surface—in order to obtain a uniform surface quality.

The process is preferably controlled in such a manner that, after the cold- or hot-forming, the seam has a width of about 5 to about 10 times an original metal sheet thickness ($t_0$), and further preferably of about 6 to about 7 times the original metal sheet thickness ($t_0$).

Further preferably, the diffusion welding is followed by heat treatment ("stress-relief annealing") at a temperature of about 900° C. to about 1400° C., and preferably of about 1000° C. to about 1200° C.

According to the invention, in a metallurgical microsection no differences can be ascertained between the seam obtained by the process according to the invention and the adjacent metal sheet portions which have no seam.

According to a further aspect, the invention also relates to a device for connecting oxide-dispersed precious metal sheets, in particular for carrying out the process according to the invention. In particular, the device comprises a heatable base which can be formed and equipped as described above. Furthermore, an aligning device for arranging at least two metal sheet portions to be connected so that they overlap is provided. This aligning device can comprise hydraulically, pneumatically and/or electrically actuable clamping jaws. After the clamping, at least one of the at least two metal sheet portions rests on the base. Furthermore, a hammer for subjecting the metal sheet portions to diffusion hammer welding is provided. Semi-automatic or fully automatic hammers can be used.

A device according to the invention preferably comprises a heatable base which is suitable for heating to about 300° C. to about 600° C., preferably to about 350° C. to about 550° C., further preferably to about 400° C. to about 500° C., at least on its surface contacted by the metal sheet portion(s).

The description which follows discusses the invention on the basis of preferred exemplary embodiments:

Figure 4:
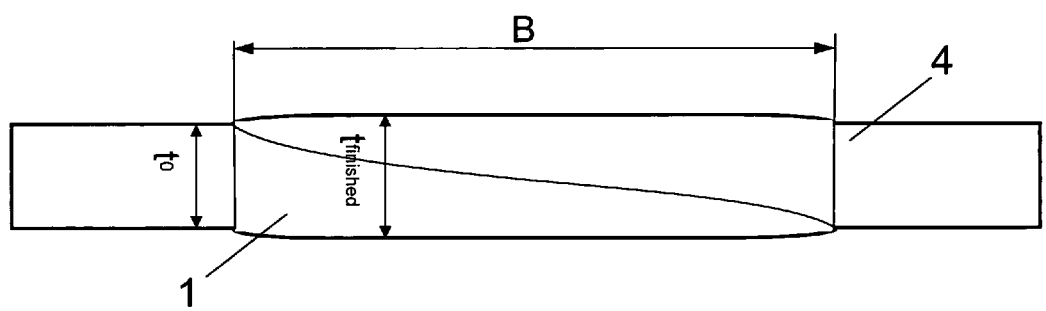
Figure 5:
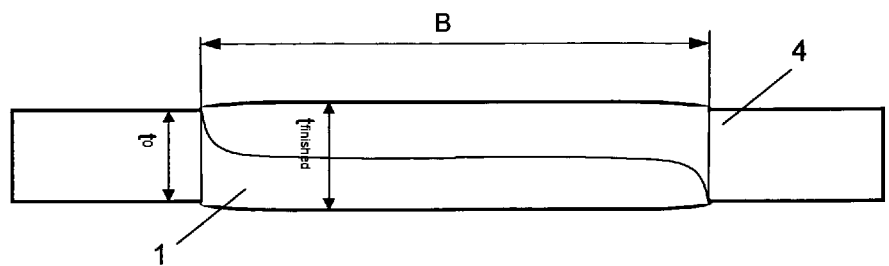
Figure 6:
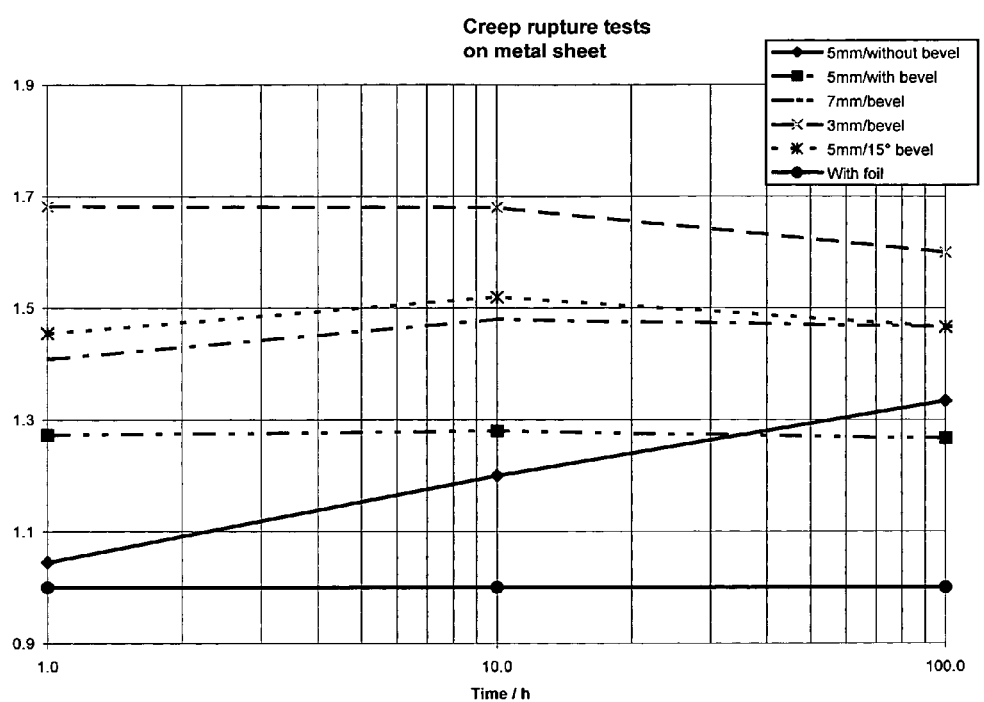

FIG. 4 shows a further basic diagram showing the two metal sheet portions which are connected by diffusion hammer welding and have also been subjected to cold-forming; and FIG. 5 shows a further basic diagram showing two metal sheet portions which have been connected by diffusion hammer welding according to the prior art processes and have also been subjected to cold-forming; and FIG. 6 shows a graph showing the normalized creep rupture strengths.

Figure 1:
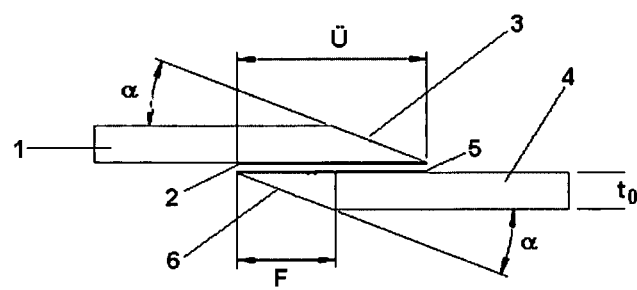
FIG. 1 shows a basic diagram showing two chamfered metal sheet portions before joining, the chamfers facing away from one another according to the invention.

In FIG. 1, the two metal sheet portions, a first metal sheet portion 1 and a second metal sheet portion 4, can be seen, and in this embodiment these have an identical or at least very similar metal sheet thickness $t_0$. These thicknesses can also differ from one another. Both ends of the metal sheet portions are chamfered in a straight manner outwards, i.e. on that side which faces away from the respective adjacent metal sheet portion, and therefore chamfers 3 and 6 are formed at a chamfer angle α, the chamfer width being denoted by F. According to one aspect of the invention, these chamfers are thus oriented in such a manner that, in the state in which they are not joined, the two metal sheet portions are not in a plane or not substantially in a plane. In an overlap region with an overlap width Ü, the respective contact portions 2 and 5 to be subsequently contacted of the two metal sheet portions lie opposite one another, it being possible to roughen these contact portions. The overlap width Ü is always greater than the chamfer width F.

Figure 2:
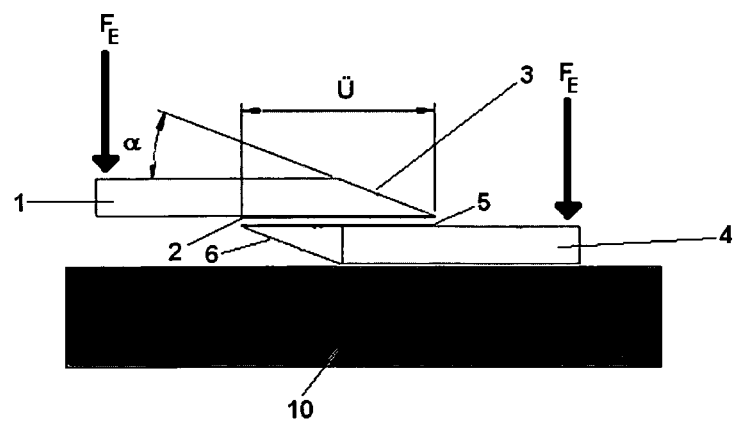
FIG. 2 shows a further basic diagram similar to FIG. 1, but in which a metal sheet portion is positioned on a heated base 10 and/or an anvil.

FIG. 2 shows an embodiment in which the second metal sheet portion 4 rests on a base 10, such as an anvil, which has already been heated or is still to be heated. In this case, the heat should be transferred from the base initially to the second metal sheet portion 4 and, if appropriate, also to the first metal sheet portion 1. If part of the first metal sheet portion 1 also rests on the base 10, heat is also transferred via this, although the preheating of the points of the metal sheet portions to be welded is important.

Both metal sheet portions 1 and 4 are clamped by an aligning device (not shown) with a clamping force $F_E$. The aligning devices are generally only connected to the base 10 indirectly via the clamped metal sheet portions.

Figure 3:
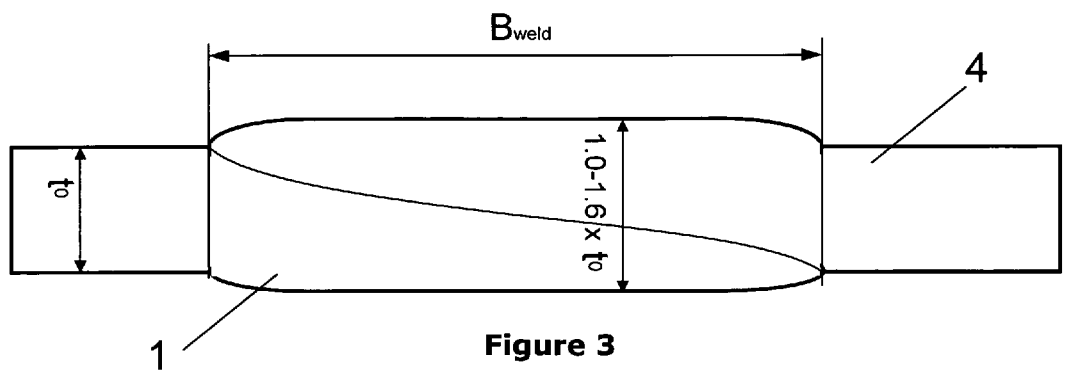
FIG. 3 shows a further basic diagram showing two metal sheet portions connected by diffusion hammer welding.

FIG. 3 shows the two metal sheet portions 1 and 4 in a form in which they have been joined together by diffusion hammer welding. This produces a structure as shown schematically in FIG. 3. In the region of the welded seam, the thickness is 1.0 to 1.6 times the original metal sheet thickness $t_0$. The width of the welded seam is $B_{weld}$ and is generally wider than the original overlap width Ü (cf. FIG. 1).

FIG. 4 shows, above all, the reduction in thickness obtained by cold-forming, with a thickness $t_{finished}$ in the region of the welded seam. As already mentioned, this substantially corresponds to $t_0$ or is only slightly greater. The finished width B of the welded seam in turn is wider than the welded seam width shortly after the diffusion hammer welding.

EXAMPLES

In a comparative example, a metal sheet portion consisting of the material FGSPtRh10 (PtRh10 fine-grain stabilized with zirconium oxide) and having a thickness of 0.8 mm and a chemically pure platinum foil inserted between the metal sheet portions was subjected to diffusion welding; as examples according to the invention, a plurality of metal sheet portions having different chamfers and overlaps were subjected to diffusion welding. The different overlap lengths and chamfer angles are given in Table 1. The base was preheated to a temperature of about 400° C. and then subjected to diffusion welding at a temperature of about 1250° C. After cooling, the seam was hammered down to the original metal sheet thickness at room temperature. The creep rupture strength results normalized with respect to the comparative example at one hour, ten hours and one hundred hours at a temperature of 1400° C. are given in Table 2 and shown in FIG. 6. In order to determine the creep rupture strength, strips having a seam and a length, width and height of 600 mm, 5 mm and 0.8 mm are loaded with different weights at a temperature of 1400° C. in a furnace, and the time taken until rupture is plotted against the tensile force. The creep rupture strengths at one hour, ten hours and one hundred hours are determined from the plot obtained and normalized with respect to the creep rupture strength of the comparative example. The overlap lengths and chamfer angles are shown in Table 1.

TABLE 1

| Example | Overlap Ü[mm] | Chamfer |
| --- | --- | --- |
| 1 | 5 | none |
| 2 | 5 | <27° |
| 3 | 5 | <20° |
| 4 | 7 | <27° |
| 5 | 3 | <27° |
| Comparative | 7 | <27° |

TABLE 2

| Time [h] | Example 1 | Example 2 | Example 4 | Example 5 | Example 3 | Comparative example |
| --- | --- | --- | --- | --- | --- | --- |
| 1.0 | 1.0 | 1.3 | 1.4 | 1.7 | 1.5 | 1 |
| 10.0 | 1.2 | 1.3 | 1.5 | 1.7 | 1.5 | 1 |
| 100.0 | 1.3 | 1.3 | 1.5 | 1.6 | 1.5 | 1 |

The considerably improved creep rupture strength compared to the comparative test can be seen from this result.

The yield strength is reduced only slightly compared to the unwelded starting material. Even after a relatively long time (100 h in test operation), the creep rupture strength is only at most ca. 20% lower than that of the unwelded starting material. At higher temperatures (1400° C.), the creep rupture strength is almost 50% higher than in the case of the sample having a foil inserted into the welded seam.

The invention likewise encompasses individual features in the figures, even if these are shown therein in conjunction with other features and/or are not mentioned above or below.

The invention likewise encompasses embodiments with any combination of features which are mentioned or shown above or below in relation to various embodiments.

The invention likewise encompasses the precise or exact expressions, features, numerical values or ranges, etc. if these expressions, features, numerical values or ranges have been mentioned above or below in conjunction with expressions such as "about, ca., around, substantially, generally, at least" etc. (i.e. "about 3" should likewise encompass "3" or "substantially radially" should also encompass "radially").

The invention claimed is:

1. A process for connecting oxide-dispersed precious metal sheet, comprising:
   preheating a base;
   arranging at least two precious metal sheet portions, each having a chamfered edge having a chamfer width, in an overlapping arrangement thereby forming an overlapping region having an overlap width, wherein the chamfered edges of said at least two metal sheet portions are facing away from each other in the overlapping region such that the chamfered edges do not contact each other, wherein the overlap width is greater than the chamfer width, and wherein at least one metal sheet portion is resting on the base; and
   subjecting the at least two metal sheet portions in the overlapping region to diffusion hammer welding, thereby connecting the at least two metal sheet portions and obtaining a combined thickness of the connected sheet portions of between 1.0 and 1.6 times an initial metal sheet thickness.

2. A process for connecting oxide-dispersed precious metal sheet, comprising:
   chamfering an edge of each of at least two metal sheet portions to be connected, wherein each of the chamfered edges has a chamfer width;
   arranging the at least two metal sheet portions in an overlapping arrangement thereby forming an overlapping region having an overlap width, wherein the chamfered edges of said at least two metal sheet portions are facing away from each other in the overlapping region such that the chamfered edges do not contact each other, and wherein the overlap width is greater than the chamfer width; and
   subjecting the at least two metal sheet portions in the overlapping region to diffusion hammer welding, thereby connecting the at least two metal sheet portions and obtaining a combined thickness of the connected sheet portions of between 1.0 and 1.6 times an initial metal sheet thickness.

3. The process of claim 1, wherein the precious metal sheet is a metal sheet comprising platinum, gold, rhodium, iridium, ruthenium, palladium, osmium or alloys thereof with one another.

4. The process of claim 2, wherein the precious metal sheet is a metal sheet comprising platinum, gold, rhodium, iridium, ruthenium, palladium, osmium or alloys thereof with one another.

5. The process of claim 2, wherein the chamfer width (F) of the chamfered edges is 1 to 3 times the original metal sheet thickness ($t_0$).

6. The process of claim 1, wherein the base is preheated to 300 to 600° C.

7. The process of claim 1, wherein said arranging involves arranging the metal sheet portions directly one above or below another.

8. The process of claim 1, wherein the overlap width is 2.5 to 7.5 times the original metal sheet thickness ($t_0$).

9. The process of claim 2, wherein the overlap width is 2.5 to 7.5 times the original metal sheet thickness ($t_0$).

10. The process of claim 1, wherein after the diffusion hammer welding, the overlap of the metal sheet portions is 3 to 8 times the original metal sheet thickness ($t_0$).

11. The process of claim 2, wherein after the diffusion hammer welding, the overlap of the metal sheet portions is 3 to 8 times the original metal sheet thickness ($t_0$).

12. The process of claim 1, wherein the diffusion hammer welding is carried out using a gas-oxygen torch such that the metal sheet portions are heated locally to a temperature of 1000 to 1700° C.

13. The process of claim 12, wherein the metal sheet portions are heated to a temperature of 1200 to 1300° C.

14. The process of claim 1, wherein the metal sheet portions are roughened on mutually facing sides before they are arranged to overlap with a surface roughness $R_a$ of 0.05 to 25 μm.

15. The process of claim 14, wherein the metal sheet portions have a surface roughness $R_a$ of 0.5 to 10 μm.

16. The process of claim 1, wherein after the diffusion hammer welding, a seam produced by the diffusion hammer welding is subjected to cold- or hot-forming, wherein the thickness of the seam is reduced to 0.9 to 1.2 times the original metal sheet thickness ($t_0$).

17. The process of claim 16, wherein a thickness of the seam is reduced to the original metal sheet thickness ($t_0$).

18. The process of claim 16, wherein after the cold- or hot-forming, the seam has a width of 5 to 10 times an original metal sheet thickness ($t_0$).

19. The process of claim 1, wherein the diffusion welding is followed by stress-relief annealing at a temperature of 900 to 1400° C.

20. The process of claim 5, wherein the chamfer angle is from 15 to 27° with respect to a planar upper or lower surface of the metal sheet.

\* \* \* \* \*